MINIATURE INDUCTIVE DEVICES

Filed Dec. 12, 1969 3 Sheets-Sheet 1

INVENTOR
JOSEPH N. SWEENEY
HENRY SPOLDI

BY Sherman & Shalloway
ATTORNEY

FIG. 10
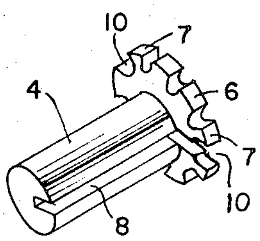
FIG. 7
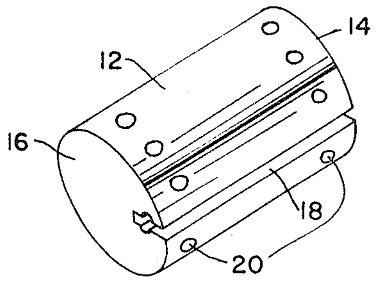
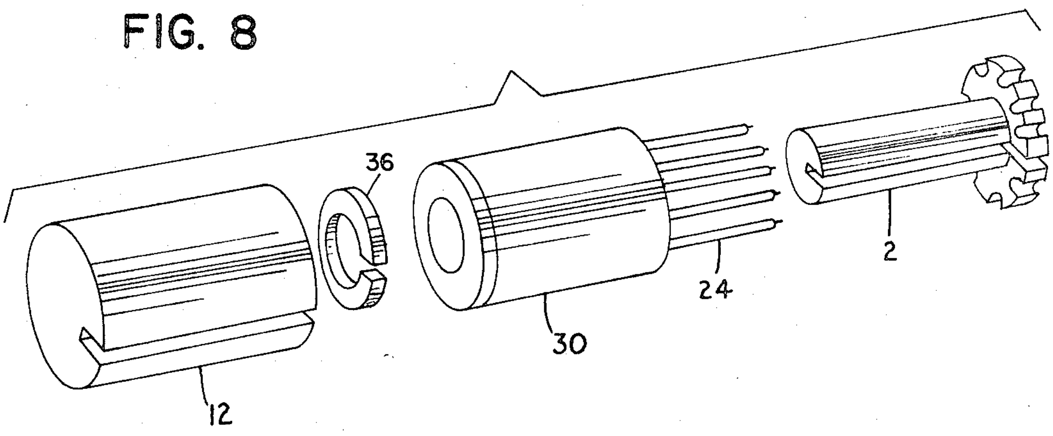
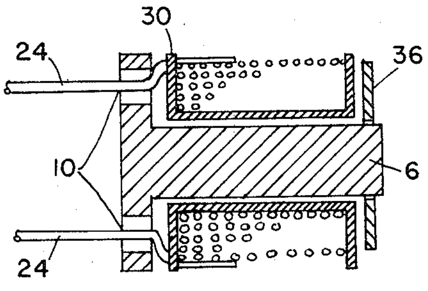
FIG. 9
INVENTOR
JOSEPH N. SWEENEY
HENRY SPOLDI
BY
Sherman & Shalloway
ATTORNEY

MINIATURE INDUCTIVE DEVICES

Filed Dec. 12, 1969 3 Sheets-Sheet 3

INVENTORS
JOSEPH N. SWEENEY
HENRY SPOLDI

BY Sherman & Shalloway
ATTORNEYS 3,551,864

MINIATURE INDUCTIVE DEVICES

Joseph N. Sweeney, Woodbury, and Henry Spoldi, Bronxville, N.Y., assignors to Pico Electronics, Inc., Mount Vernon, N.Y., a corporation of New York Continuation-in-part of application Ser. No. 702,429, Feb. 1, 1968. This application Dec. 12, 1969, Ser. No. 884,595
Int. Cl. H01f *15/02*
U.S. Cl. 336—83 19 Claims

ABSTRACT OF THE DISCLOSURE

A miniature electronic device comprising a magnetic core including a magnetic rivet, magnetic wafer and container, a winding attached to said rivet, and the magnetic container enclosing the rivet, wafer, and winding wherein the components are tightly attached to provide durable and duplicable air gaps including a minimum gap in said core.

This application is a continuation-in-part of our copending application Ser. No. 702,429, filed Feb. 1, 1968 now abandoned.

This invention broadly relates to electronic components. More specifically, the invention provides a novel miniature or subminiature wound magnetic core adapted for use in inductive devices. The novel core of this invention may be used in electro-magnetic devices such as transformers and inductors. The scope of this invention further encompasses a novel method of forming such devices.

In recent years electronic equipment and consequently their component parts have undergone a vast dimensional change. Such changes were first necessitated by the stringent space age requirements for smaller and lighter weight equipment. In many instances, inductive devices are eliminated as a component because they cannot meet the requirements of small size, high efficiency, low weight and high reliability. This invention allows certain inductive devices to meet these requirements at a moderate cost.

In some cases the problems presented by reducing dimensions has necessitated more than a change in degree; it has necessitated a change in "kind." One area where such problems necessitated a new approach rather than a mere reduction in size is in the field of inductive devices. To illustrate this, a general review of the comonents of normal or "large" inductive devices is warranted.

Magnetism, which is one underlying principle utilized in inductive devices, has been recognized, at least in its effects, since the time of the ancient Greeks. The ancient Greeks observed that "lodestone" ($Fe_3O_4$) had the ability to attract bits of iron. Ancient mariners used long narrow pieces of magnetic material to indicate directions since it was observed that such materials tend to align themselves in a north-south direction. The Danish scientist, Hans Christian Oersted, in 1820 discovered that a compass may be deflected by placing it above or below and parallel to a current carrying electrical conductor. Ampere contributed to the developing technology of the nineteenth century by noting that two current carrying conductors exert forces on each other which he analogized to magnetic forces of attraction. Today the interaction of electric and magnetic fields serves as the basis for the operation of inductive devices such as transformers and inductors.

Faraday showed that a change in magnetic flux through a conductor induces a current in that conductor and Lenz proved that the induced current is opposite in direction to the inducing force. These principles were combined with observations relative to the magnetic and electrical properties of substances to provide our modern electrical devices.

By passing a current of varying magnitude, such as an A-C current, through a conductor coiled around a core, the current induces a magnetic field of its own which combines with the inherent magnetic properties of the core to provide the varying magnetic flux which Faraday found would induce a current in a second conductor placed within the influence of the changing magnetic flux. The size of the induced current depends on the size of the initial current. In transformers, a core of magnetic material is placed next to a current-carrying conductor by coiling the conductor around a magnetic core. The magnetic core flux is increased in strength as current passes through the coil and thus produces an "induced" electric current in a second coil which is within the influence of the varying magnetic flux and is not in electrical contact with the first coil.

In miniature transformers the components must be small, reliable and sturdy. Previously used devices have been inefficient due to the tendency of DC currents to saturate the core and consequently eliminating any induced current. Additionally, eddy currents which are inherently produced in transformers are detrimental since they counteract and partially negate the primary currents in the device.

To reduce the eddy currents in a transformer, a resistance is supplied in their flow path or a portion of the path is cut out, thus breaking their flow and dissipating the eddy currents.

To prevent DC saturation, an air gap is provided in the path of these currents which breaks the circuit and dissipates these currents. But the air gap is extremely detrimental, since it also reduces the efficiency of the inductive device. Therefore, when an inductor is formed, if DC saturation is contemplated—and it is in many instances—a precise air gap must be provided to eliminate the effects of the DC currents while still allowing optimum AC performance.

This invention enables the production of small inductive devices which may contain air gaps of predetermined magnitude and also can provide an air gap with a minimum size for such conditions where no DC currents are contemplated. Thus, even though some air gap is inherently formed by mating surfaces of the components of a transformer or inductor, this invention enables one to achieve the minimum inherent air gap or to establish an air gap of predetermined finite value.

The disadvantage of the previously used devices lies in the fact that the incredibly small size of the air gap used in miniature devices cannot be maintained in manufacturing and in some cases cannot even be achieved. Thus, even if the gap is initially set right the further processing displaces it even a fraction of one thousandth of an inch and destroys the efficiency of the adjustment and the device.

Essentially, the present invention provides air gaps which depend on accurate alignment of components manufactured to close tolerances which may be assembled tightly to avoid any displacement of the predetermined air gap. The air gap is thus determined and the parts made to fit it rather than the prior method of making parts and adjusting to a desired air gap. This is achieved by making a rivet and container to desired size and assembling them so the desired air gap is inherently and unadjustably produced. The air gap can be minimized by this invention when such minimization is required, for example, under conditions of use involving zero DC potential.

An additional improvement relates to the adaptability of the novel device of this invention to easy and economical manufacturing processes. None of the prior methods of manufacturing miniature devices disclose the option of either winding an electrical conducting coil on the core directly or on a bobbin which is subsequently placed in the core. This choice becomes important depending on the intended use of the device. A bobbin could be required in uses having specific requirements of temperature, voltage, leakage inductance, capacitance, economy and combinations of these factors. Alternatively, spatial economy and low voltage often dictate the elimination of a bobbin.

Thus, this invention provides a versatile miniature inductive device in that it can be economically produced with a specified or minimal air gap with or without the use of a bobbin.

It is a primary object of this invention to provide a miniature inductive device.

It is another object of this invention to provide the subject device which will reduce eddy currents to allowable limits.

Another object is to provide the subject device which will avoid DC saturation of the core.

A further object is to provide the subject device wherein an air gap in the magnetic current can be accurately produced to prevent DC saturation of the core, and a minimum air gap can be produced wherein zero DC current is to be experienced.

Still a further object of the invention is to provide a container having an open mouth and an eddy current preventing slot with a bridge connecting the mouth of the container and terminating the slot to assure a full seat snap action connection between a rivet and the container.

A complementary object is to produce the air gap in a maintainable state whereby further manufacturing steps do not vary the air gap.

Still another object is to produce a miniature device having an accurate air gap which may or may not use a bobbin in the coil winding.

Yet another important object of this invention is the provision of a miniature inductive device having a magnetic rivet carrying a coil and placed within a magnetic container along with wafers which permit a predetermined air gap to be rigidly maintained once the unit is snapped together.

A still further object is to provide a magnetic container and rivet for a miniature inductive device that are constructed of a material having a spring characteristic with the portion of the rivet snapping into the container being slightly larger than the mating portion of the container so that a force fit results producing the snap action connections.

These objects as well as others will become apparent from the following description and drawing which illustrate the invention.

Referring to the drawings wherein like numerals represent like elements,

FIG. 7 is a perspective view of a modified container according to this invention;

FIG. 8 is an exploded perspective view showing an alternate arrangement of the components of this invention wherein both a bobbin and wafer are utilized;

FIG. 9 is a sectional view showing the winding with bobbin and wafer according to this invention;

FIG. 10 is a perspective view of a rivet with modified head according to this invention;

Figure 1:
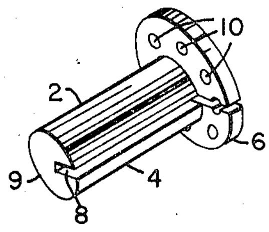
FIG. 1 is a perspective view of a rivet with head according to this invention.

The rivet of FIG. 1 is generally depicted by reference numeral 2. The rivet forms an integral part of the core in the inductive devices and is composed of magnetic material such as silicon steel, 47% or 80% nickel-iron alloy, oriented silicon steel or any other suitable magnetic material.

The rivet 2 comprises a shank 4 and a head 6. The rivet is provided with a radial cut-out slot 8 which provides resistance to the circular eddy current flow. Slot 8 thus serves to minimize eddy currents when necessary. The slot can be eliminated when one chooses to maximize the magnetic cross section without concern for eddy currents. Holes 10 are provided in head 6 to permit egress of the lead wires from a coil carried by the rivet. This assembly can better be seen in FIGS. 3 and 4. An advantage of this rivet head with egress holes becomes apparent when compared to conventional transformers such as shown in U.S. Pats. 2,867,894 and 2,976,502. These devices provide a core carrying a winding, but a separate header element is required to hermetically seal the egress of the lead wires from the coil. This header is conventionally applied subsequent to coil winding. The present invention thus eliminates one part of conventional coils by utilizing the integral header and core illustrated in FIG. 1 comprising a one-piece rivet with egress holes in its head. This advantage allows smaller and less expensive devices to be manufactured. An alternate form illustrating the variations possible is shown in FIG. 10 wherein holes 10 are moved radially outward and extend through rim 7.

Figure 2:
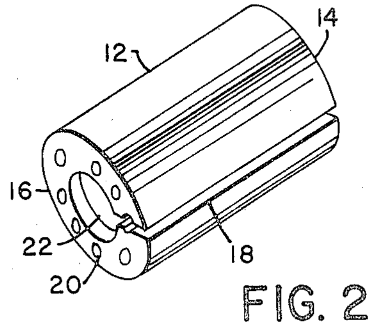
FIG. 2 is a perspective view of a container according to this invention.

FIG. 2 illustrates the second component of the magnetic core, i.e., the container designated 12 which has a first end 14 and a second end 16. The first end 14 is adapted to receive the head 6 of rivet 2 in a close fitting relationship. The second end 16 may have a hole 22 adapted to receive end 9 of shank 4 in a tight-fitting engagement or in a spaced relation to provide a desired air gap. As shown in FIG. 7, the end 16 may be solid. In these cases, the end 9 may or may not abut the inside of end 16, depending on the size air gap required. Because of the spring characteristic of the core material and the relative size of the openings of the container compared to the size of the mating parts of the rivet, high frictional force can be generated on the mating surfaces between rivet and container which holds the rivet and container in assembled relationship, while the connection between the rivet and container at one end of the container is always of the force fit type with the high frictional forces resulting in a snap action connection whereby the rivet is either full seated in the container or free from the container, the tightness of the fit at the opposite end of the container will be determined by the size of the air gap required. When an absolute minimum air gap is required (i.e., under conditions of zero DC current), tight mating surfaces at each end of the container are provided. When a specified air gap is required, it is formed by mating one end of the container tightly with the rivet to hold the components in rigid assembly, and the air gap results at the oppoiste end, where an air gap of predetermined size occurs. As noted above, the end 16 may be solid so in the last mentioned cases (minimum or specified air gap) the mating of end 9 and end 16 may be an abutment (minimum gap) or a preselected space (specified).

Slot 18 serves as does slot 8 to prevent eddy current. The slots to prevent eddy current may be provided in the rivet, the container, or both. In those cases where the reduction of eddy current is not important, a slot is not necessary in either the rivet or the container. Holes 20 in end 16 provide egress for lead wires of a coil carried by rivet 2.

Figures 3, 4, 5:
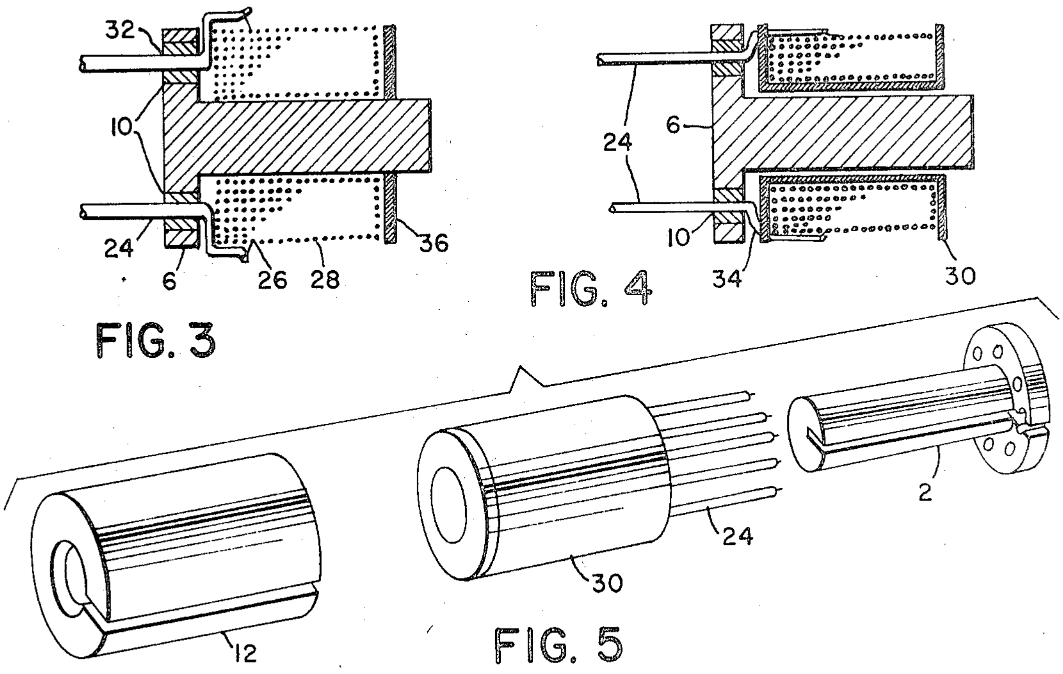
FIG. 3 is a sectional view showing the winding of this invention.
FIG. 4 is a sectional view showing the winding with bobbin of this invention.
FIG. 5 is an exploded perspective view showing the components of the invention wherein a bobbin is utilized.

Container 12 is the "cup portion" of the core in that it forms a container for the rivet holding a wound coil in its cylindrical cavity. The assembled components shown in FIG. 5 illustrate that element 12 not only completes the magnetic circuit but also completely encloses and contains the winding. No additional elements are required as in conventional devices to contain the coil and again economy of construction is achieved as well as a reduction in the size of the device.

Another important feature of this invention is the provision of a magnetic wafer 36 adjacent the shank end 9 of the rivet 2; the wafer serving to complete the magnetic circuit and giving added support to the coil winding in bottom 30. This assembly is shown in FIG. 8. The magnetic wafer can be used alone or in conjunction with a bobbin. When used alone, wafer 36 acts as a part of a magnetic bobbin in completing the magnetic circuit and it also supports the windings and further gives added thickness to the container end 16 giving further potential for air gap manipulation. When the wafer is used without a bobbin, it is of a magnetic material and the assembled rivet and wafer are coated with a suitable insulation prior to winding. If it is found that added thickness is required at container end 16, then a joint wafer 36 may be slipped over the shank end of the rivet to give increased magnetic flux. This is often found more desirable than altering the thickness of container end 16, although that is also possible.

The manipulation of the air gap afforded by the use of wafers is significant, since several wafers provide a laminated type of structure. This laminated end structure causes the magnetic flux to split into many paths and thus reduce eddy currents.

The rivet and container snap together to provide an essential feature of this invention. The assembly provides a rigid and sealed inductive device. The snap action is achieved by constructing the rivet and container of a magnetic material having a spring characteristic or a high modulus of elasticity. The portion of the rivet engaged by the container is slightly larger than the mating opening of the container to insure a force fit when the elements are assembled and thus the snap action. By at least partially enclosing at least one end of the container, the spring material of the container produces a unique constructional advantage. The added mass at the end of the container tends to in effect increase the elastic limit of the material so that the snap action resulting from forcing the rivet into the container does not cause the material to exceed its elastic limit. Without the closed end and spring-type material, the rigid connection between the two elements would be lost because the material would exceed its elastic limit and produce a re-orientation of the molecules in the magnetic material. The container may be sealed when assembled with a resin or "potting" material. A suitable resin is Aritemp #201 produced by the Aires Laboratories, Inc., or a suitable settable epoxy resin. The encapsulating step is performed afer assembly; a heated and liquid resin is poured in the axially closed assembly under pressure if necessary through either the slot 18 or holes 10 or holes 20 to completely fill the space within the sleeve not occupied by the rivet and coil. The resin when set closes all openings and seals the parts in their rigid state. The potting material may be cured in an oven under the usual time and temperature conditions.

Referring to FIG. 3, it is seen that lead wire 26 of the coil 28, whether the coil is wound directly on the rivet or whether a bobbin 30 (FIG. 4) is used or whether both a bobbin and wafer are used (FIG. 9), may be attached to pre-set heavier wire 24, placed in the openings 10 of the rivet and the openings 20 of the container 12. The coil wires are generally thin and susceptible to breakage; therefore, the exposed wires are usually heavier to provide a durable device. If the heavier wires are pre-set in the core as shown in FIG. 3, an insulating material 32 such as molten glass or potting material may be used. An alternative procedure is to secure the terminal leads in holes 34 provided in bobbin 30 of FIG. 4 and then pass the leads through holes 10 in rivet head 6. In either case, a rigid assembly results, since the lead wires are attached to firmly supported heavier terminal wires. The elimination of a separate header is thus illustrated, since the terminals are hermetically sealed in the rivet head, which is an integral part of the core. Also, when a wafer 36 is used, the terminals may be pre-set or loose. In some cases, neither holes 10 in the head 6 nor holes 34 in bobbin 30 need contain embedded terminals. The later encapsulating step may provide potting material to set all components. The use of pre-set terminals depends on the size and intended use of the device, since of course greater stability during manufacture is achieved when the terminals are pre-set.

Referring again to FIG. 3, a wafer 36 may be used in conjunction with or as an alternative to a bobbin. In some cases, a bobbin is eliminated and wafer 36 is used in order to assist in supporting the winding 28. In such cases, the wafer may be made of insulating material such as phenolic resins and other plastics or rubbers. The wafer also can be made of magnetic material to reduce wasted space. This wafer provided stability of the coil on the rivet and in cases where less accurate devices are used, both bobbin and wafer may be eliminated depending then upon the tight winding of the coil on shank 4 to support the coil during manufacture. The potting material will, of course, assist in maintaining the alignment during use of the finished device. When the wafer is used, it may have egress holes (not shown) therein if needed. The wafer may be of magnetic material like container 12 when it is used to complete a magnetic circuit, or may be non-magnetic for other uses.

The magnetic wafer(s) 36 permit great flexibility in constructing the inductive device of this invention and many associated advantages, some of which are summarized as follows:

(a) adds another gap manipulation element,
(b) reduces eddy current loss,
(c) eliminates the winding bobbin,
(d) increases the cross section of the magnetic circuit,
(e) increases the critical gap area.

(a) Gap manipulation can be accomplished by adjusting the fit between the inside diameter of the wafer and the diameter of the rivet shank and the fit between the inside diameter of the container and the outside diameter of the wafer. In those cases where minimum gap is required, the dimensions of the container, wafer and rivet would be made to yield a very tight fit.

(b) Eddy current losses can be reduced by using many thin wafers instead of a single thickness of equal cross section because of the increases resistance to eddy currents in a laminated structure. In the case of the embodiment where we use a solid bottom container, (FIG. 7) we may choose to use wafers with no hole in the center and place them in the bottom of the container so that we have a laminated as opposed to single thickness structure and therefore lower eddy currents.

(c) In those cases where space is at a premium or economy dictates the elimination of the epoxy bobbin, a magnetic wafer can be cemented to the rivet shank; we thus have a magnetic bobbin. We coat the winding area with a thin insulating medium and then we can wind directly upon the core with the wafer and rivet head serving as winding supports. In this case, no valuable space is wasted for plastic bobbin area and we also eliminate the cost of the bobbin.

(d) In those cases where increased cross section and increased flux is required the cross section of the bottom of the container can be increased by the simple expedient of increasing the thickness of the wafer or by adding several wafer units.

(e) The most critical gap area in this inductive device is at the junction of the rivet shank and the container. If minimum gap is required or if a critical gap control is necessary, it is very important to have a large area on the facing surfaces at this junction. The wafer or wafers allow for this flexibility in design.

FIG. 5 illustrates the manner in which the components are telescopically assembled wherein the finish leads 24 extend from only one end of the bobbin. These leads will be inserted in holes in rivet 2 and no holes are needed in sleeve 12.

Figure 6:
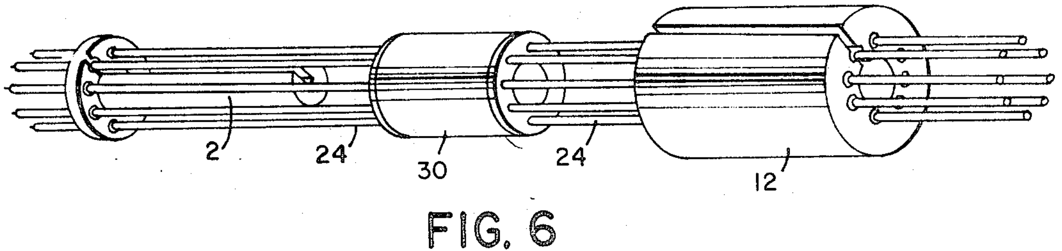
FIG. 6 is an exploded perspective view showing the components of the invention wherein a bobbin is utilized with leads from both ends of the bobbin.

FIG. 6 shows a modification of FIG. 5 wherein finish leads 24 extend from both ends of bobbin 30. Here leads 24 extend axially through holes in both the rivet 2 and sleeve 12.

Figures 11, 12, 13:
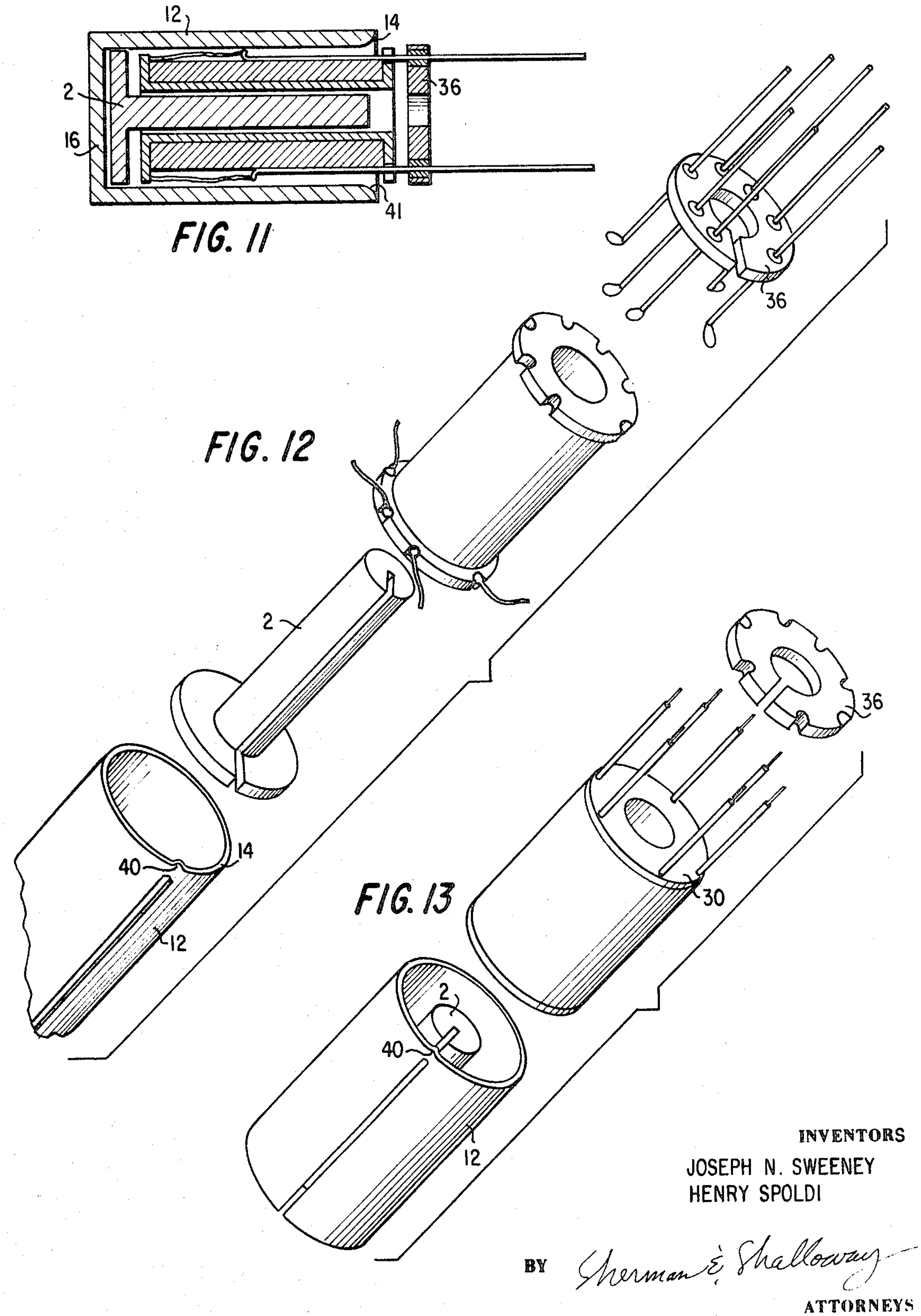
FIG. 11 shows another embodiment of the device in cross-section.
FIGS. 12 and 13 show perspective views of alternate arrangements of this invention.

Many other modifications are of course possible. One modification, as seen in FIGS. 11 and 12, reversed the direction of insertion of the rivet 2. Here a coil is wound on the rivet shank and the rivet head 6 is inserted in container 12 to abut end 16. Here again a bobbin may or may not be used. Further, this embodiment reverses the position of wafer 36 so it will be adjacent container end 14 rather than 16 as above described. If a bobbin is used here, we can make rivet 2 and container 12 as an integral unit having end 16 integral with head 6, as shown in FIG. 13, but this design is less flexible.

Of course, design and operational requirements will vary with the number of coils used in the device and the leads utilized. The novel magnetic core of this invention is adapted to accommodate all possible variations through the optional use of a bobbin or a plurality of bobbins in sleeve 12 and the optional use of terminal leads at one or both ends.

The method of assembly will now be reviewed. The rivet 2 of FIG. 1 may be made by any suitable procedure such as turning, drawing, stamping or cold heading the desired material followed by machining the rivet to exact tolerances. Additionally, the rivet must be annealed prior to use. The holes or openings 10 and slot 8 may be made using conventional techniques, with the number, location and size of the holes and slots being dictated by operational considerations. For example, the holes or openings 10 may be provided at the extreme periphery of the rivet head (FIG. 10). When the lead terminals are to extend through the sleeve 12 (FIG. 7), the holes 10 may be eliminated. The container 12 can be formed in the same manner and of the same materials as rivet 2 although different materials may be employed if desired; it may contain holes 20 if required, located either in end 16 or on the periphery.

The coil 28 is wound on the shank of rivet 2 either with or without a bobbin 30 and wafer 36 in any known manner. When the coil is on the rivet, the rivet is snapped into the container 12 resulting in a completely rigid device ready for the application of a potting material. When a bobbin is not used, the coils are wound directly onto the shank of the rivet; in such cases it is necessary to first coat the shank with a thin layer of insulating material such as a plastic, preferably a phenolic resin, to insulate the windings from the core.

An air gap is provided either between the shank end 9 and holes 22 or at the junction of wafer 6 and end 14, or by spacing end 9 from solid end 16 or by abutting end 9 and end 16. As was explained above, the size of the gap is predetermined and if absolute minimum gap is required, both ends of the rivet will be made to tightly engage the container. The precision of the device results from the use of exact tolerances in the components and constructing same of a magnetic material having a spring characteristic so the assembly can be effected by a snap action connection which insures a rigid connection with minimum time and effort of assembly.

The snap action connection is particularly significant and is achieved by the maintenance of close tolerance when machining the respective parts of the device. Specifically, the snap action connection is to be understood as a relation between the rivet and the container such that when the rivet is placed in a coaxial relation with the container and pressed into the open end of the container, the rivet will first meet resistance by the effect of either the shank of the rivet hitting against the bottom of the container or the head of the rivet hitting against the mouth of the container, or both. Further pressure against the rivet in its axially aligned condition will result in a snap action of the rivet into the container and into a full seated position.

Understanding that this effect could be accomplished either at the point of connection between the shank and the hole at the bottom of the container or between the head of the rivet and the open mouth of the container or both, the description will be taken only with respect to a connection between the head of the rivet and the open mouth of the container. Thus, when the head of the rivet first hits against the container, while the two members are touching, there is no engagement between them, in the sense that movement of one will not necessarily result in movement of the other. Once the additional pressure is placed against the head of the rivet, it snaps into the container. The mouth of the container is somewhat expanded and a very minimum amount of flexing of the head of the rivet takes place, so that the head of the rivet is now seated within the container. To assure this action, a bridge 40, as is shown in FIG. 12, may be provided for holding the mouth of the container from expansion. The bridge deflects until the rivet head is seated properly and the bridge snaps back to its original position. This relation of the components, due to the close tolerance machining thereof, could aptly be described as a "toggle" effect; i.e., the only relations between the rivet and the container are either full on or full off (full seated or no connection at all). In other words, there can be no relation in the ordinary course of connecting the rivet and the container wherein the head of the rivet extends only partially into the container, such that further pressure could cause the rivet to move further into the container. To facilitate insertion of the rivet or wafer within the container the mouth of the container 14 (FIG. 11) may have a radius 41 which guides the wafer 36 into the open end of the container.

Since the rigid structure will not move, the subsequent operations such as impregnation, potting, testing do not change the air gap and there will be no degradation in the electrical performance of the unit, such as was experienced in prior devices. Although particular emphasis has been placed on transformers in illustrating the invention, no limitation is intended.

By way of summary of some embodiments of this invention an improved miniature inductive device having precise air gaps or minimum air gaps may be provided by using only a rivet 2 and container 12 inserting rivet head 6 to abut container end 14 with or without wafer 36 and/or bobbin 30; or using rivet head 6 abutting container end 16 and adding a wafer 36 at the shank end 9 of the rivet with or without a bobbin 30, in such cases the rivet 2 may be separate or integral with container 12. In all of the above embodiments egress wires and terminals may be pre-set or loose in holes positioned at any point on one or more of the elements rivet head 6, container 12, wafer 36 and bobbin 30. The specifics will be determined by operational requirements.

Having thus described this invention in full, clear and concise terms wherein the terminology and examples are merely illustrative and not limiting, the following is claimed.

What is claimed is:

1. In a miniature inductive device, a magnetic core comprising:

(a) a magnetic unitary rivet having a shank and a head;

(b) a magnetic container of substantially cylindrical construction with one end open and an opposite end at least partially closed and adapted for housing said rivet;

(c) said container having a radial slot along substantially its full length for reducing eddy currents;

(d) an electrically conductive coil wound on said rivet;

(e) at least one wafer having a central opening therethrough and positioned on the end of said shank opposite said head; and (f) the rivet fitting within the container and secured to a mating portion of the container with the portion of the rivet mating with the container being slightly larger than the mating portion of the container whereby the rivet fits rigidly within the container to provide a fixed air gap at the junctions of the rivet and the container.

2. The device of claim 1 wherein the rivet has holes through its head and the coil has lead wires attached to terminals extending through said holes.

3. The device of claim 2 wherein terminals are preset in fixed relation to the lead wires.

4. The device of claim 1 wherein the container has holes in its partially closed end and the coil has lead wires attached to terminals extending through said holes.

5. The device of claim 4 wherein the holes in the container are in the periphery of the container.

6. The device of claim 1 wherein the coil is wound on a bobbin which is carried on said rivet.

7. The device of claim 4 wherein the holes in the container are in the end wall of the container.

8. The device of claim 6 wherein the coil has lead wires attached to terminals extending through holes in the bobbin.

9. The device of claim 6 wherein said at least one wafer is provided on the rivet abutting the bobbin.

10. The device of claim 6 wherein the coil has lead wires attached to terminals extending through holes in the rivet.

11. The device of claim 7 wherein the terminals are pre-set in the rivet.

12. The device of claim 6 wherein the coil has lead wires attached to terminals extending through holes in the container.

13. The device of claim 1 wherein an axial slot is provided in the core to eliminate eddy currents.

14. The device of claim 1 wherein the core is hermetically sealed by means of a resin contained in the magnetic container.

15. The device of claim 1 wherein the rivet head is provided with gaps in the periphery thereof through which lead wires attached to the coil extend.

16. The device of claim 1 wherein an air gap is provided at the junction of the container and rivet head with the close tolerance fitting between the rivet and container being between the mating portions of the rivet shank and the opening through the partially closed end of the container.

17. The device of claim 1 wherein the air gap is provided at the junction of the container and rivet shank and the close fitting tolerance between the container and the rivet is at the mating portion of the rivet head and the open end of the container.

18. The device of claim 1 wherein a minimal air gap is provided by tight fitting engagement of the container with both ends of the rivet.

19. In a miniature inductive device, a magnetic core comprising:

(a) a unitary rivet having a shank and a head;

(b) a coil about the shank of the rivet;

(c) cylindrical container having one substantially closed end;

(d) the rivet positioned within said container with the head of the rivet abutting the closed end of the container; and (e) a wafer snapped about the shank of the rivet and snapped into rigid engagement with the end of the container opposite the closed end.

References Cited

UNITED STATES PATENTS

| | | | |
|---|---|---|---|
| 799,156 | 9/1905 | Goldberg | 336—208X |
| 2,158,613 | 5/1939 | Loughlin | 136—83X |
| 2,548,239 | 4/1951 | Ray | 336—83X |
| 2,949,591 | 8/1960 | Craige | 336—83 |
| 2,976,502 | 3/1961 | Hill | 336—83 |
| 3,381,251 | 4/1968 | Fuller | 336—83 |

FOREIGN PATENTS

| | | | |
|---|---|---|---|
| 743,216 | 3/1933 | France | 336—83 |

THOMAS J. KOZME, Primary Examiner

U.S. Cl. X.R

336—96, 178, 198, 212